United States Patent
Takahashi

(10) Patent No.: US 7,362,468 B2
(45) Date of Patent: Apr. 22, 2008

(54) IMAGE SENSING DEVICE AND IMAGE PROCESSING METHOD

(75) Inventor: Kenji Takahashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 1063 days.

(21) Appl. No.: 10/636,883

(22) Filed: Aug. 7, 2003

(65) Prior Publication Data
US 2004/0105107 A1    Jun. 3, 2004

(30) Foreign Application Priority Data
Aug. 9, 2002    (JP)    ............ 2002-233845

(51) Int. Cl.
H04N 1/60    (2006.01)
H04N 1/46    (2006.01)
G06K 1/00    (2006.01)
G03F 3/08    (2006.01)

(52) U.S. Cl. ............ 358/1.9; 358/1.15; 358/516; 358/519

(58) Field of Classification Search ............ 358/450, 358/452, 1.9, 1.15, 516, 519; 382/309, 274
See application file for complete search history.

(56) References Cited

U.S. PATENT DOCUMENTS 5,485,245 A * 1/1996 Kobayashi et al. ............ 399/1
5,995,142 A   11/1999 Matsufune
6,633,689 B2 * 10/2003 Yamamoto ................ 382/309
2004/0130732 A1 * 7/2004 Denpo ........................ 358/1.1

FOREIGN PATENT DOCUMENTS

CN    1168597 A    12/1997
JP    11-266463    9/1999

OTHER PUBLICATIONS

English abstract of JPA 11-266463 provided from the Japanese Patent Office; and.
Machine translation of JPA 11-266243 provided from the Japanese Patent Office.
An Office Action issued from Chinese Patent Office on Oct. 14, 2005 for corresponding Chinese Patent Application.

* cited by examiner

Primary Examiner—Houshang Safaipour
(74) Attorney, Agent, or Firm—Morgan & Finnegan, LLP

(57) ABSTRACT

An image sensing apparatus comprising an image sensor that senses an image of a subject, a parameter setting unit that sets a parameter used for a predetermined developing processing, and an image processing unit that selects raw data from the image sensing unit or externally supplied raw data, and performs the developing processing for the selected raw data, employing the parameter set by the parameter setting unit.

23 Claims, 10 Drawing Sheets

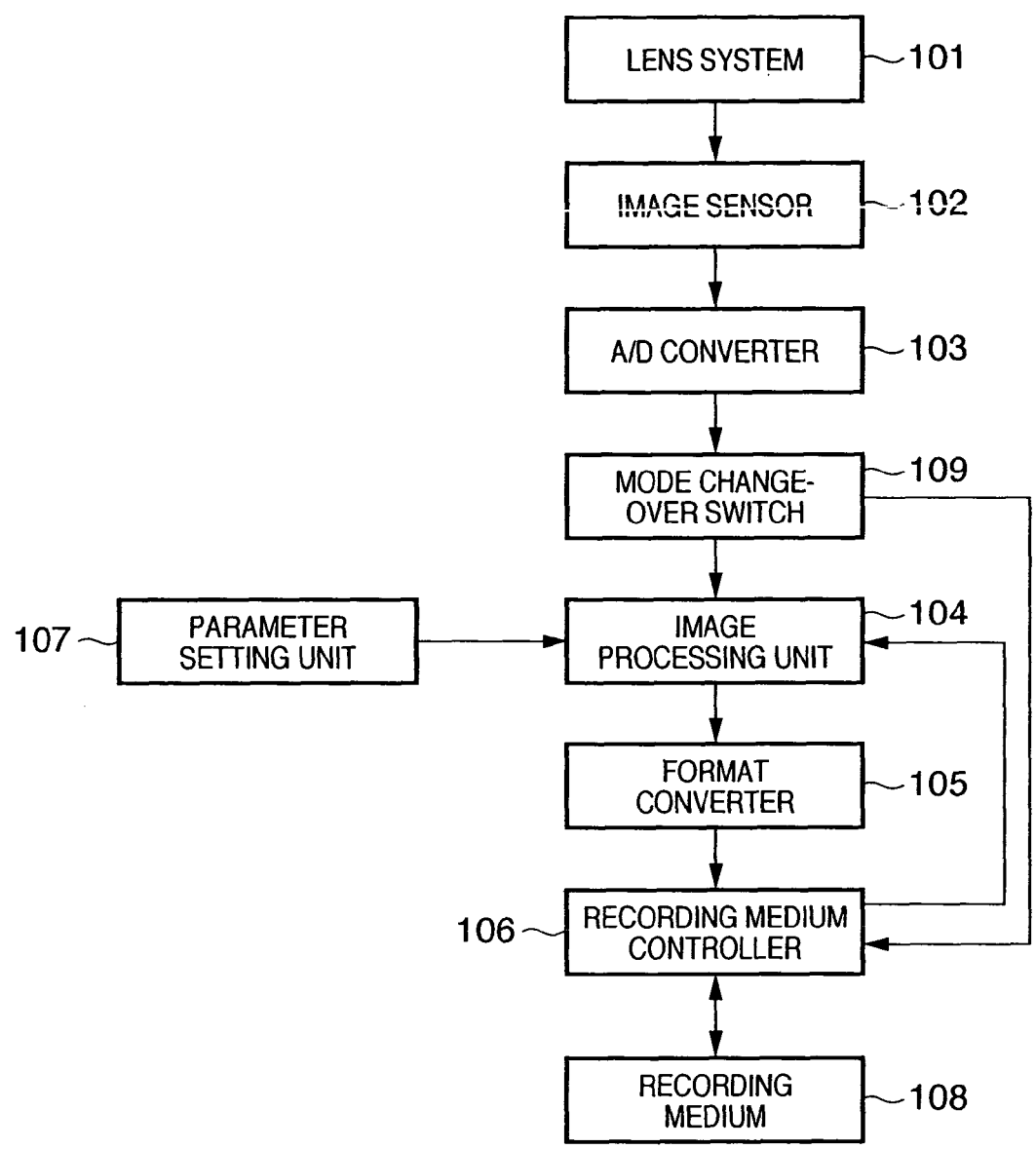
F I G. 1

FIG. 3

| R | G1 | R | G1 | R | G1 |
|---|---|---|---|---|---|
| G2 | B | G2 | B | G2 | B |
| R | G1 | R | G1 | R | G1 |
| G2 | B | G2 | B | G2 | B |
| R | G1 | R | G1 | R | G1 |
| G2 | B | G2 | B | G2 | B |

FIG. 4A

| R | R | R | R | R | R |
|---|---|---|---|---|---|
| R | R | R | R | R | R |
| R | R | R | R | R | R |
| R | R | R | R | R | R |
| R | R | R | R | R | R |
| R | R | R | R | R | R |

FIG. 4B

| G1 | G1 | G1 | G1 | G1 | G1 |
|----|----|----|----|----|----|
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |
| G1 | G1 | G1 | G1 | G1 | G1 |

FIG. 4C

| G2 | G2 | G2 | G2 | G2 | G2 |
|----|----|----|----|----|----|
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |
| G2 | G2 | G2 | G2 | G2 | G2 |

FIG. 4D

| B | B | B | B | B | B |
|---|---|---|---|---|---|
| B | B | B | B | B | B |
| B | B | B | B | B | B |
| B | B | B | B | B | B |
| B | B | B | B | B | B |
| B | B | B | B | B | B |

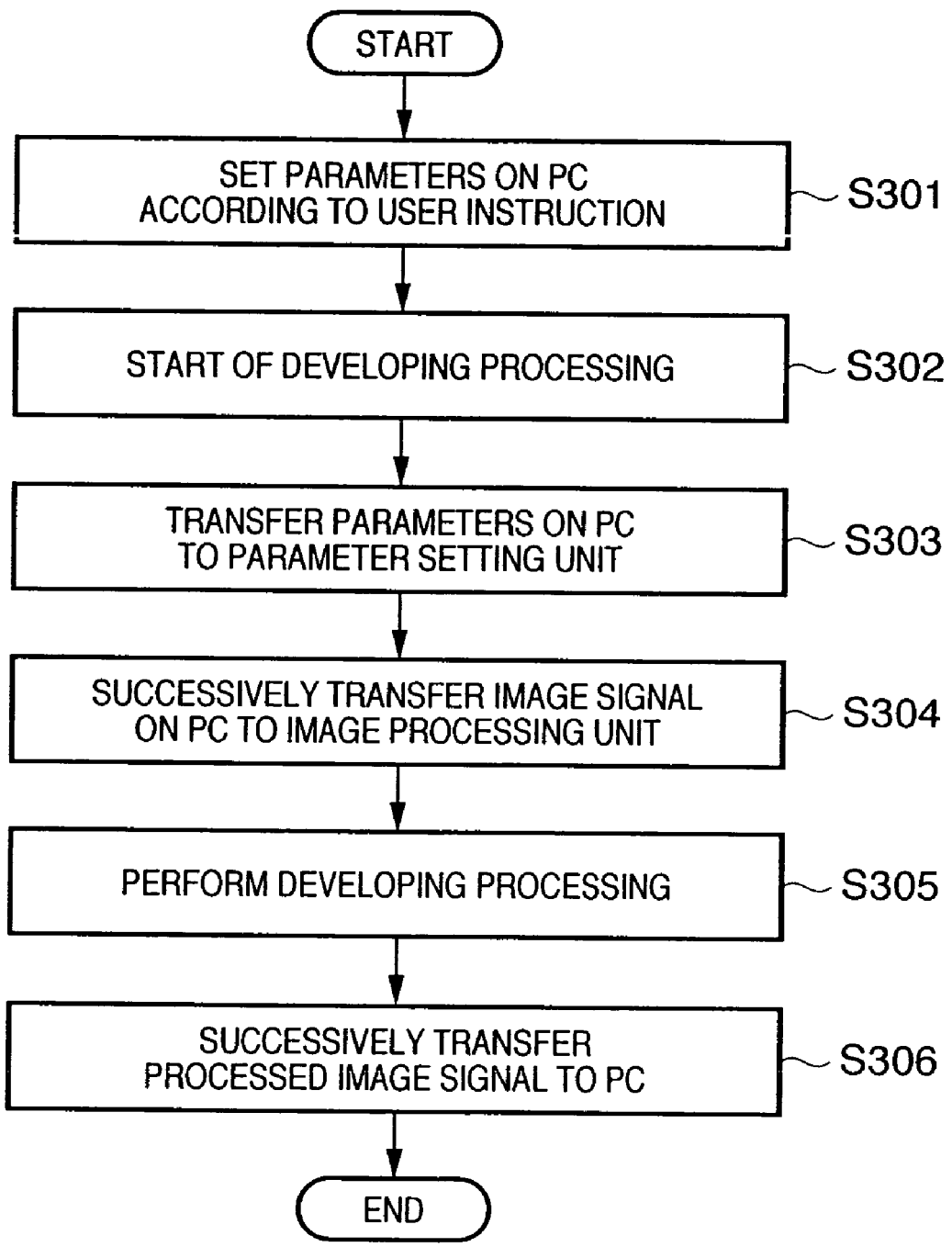

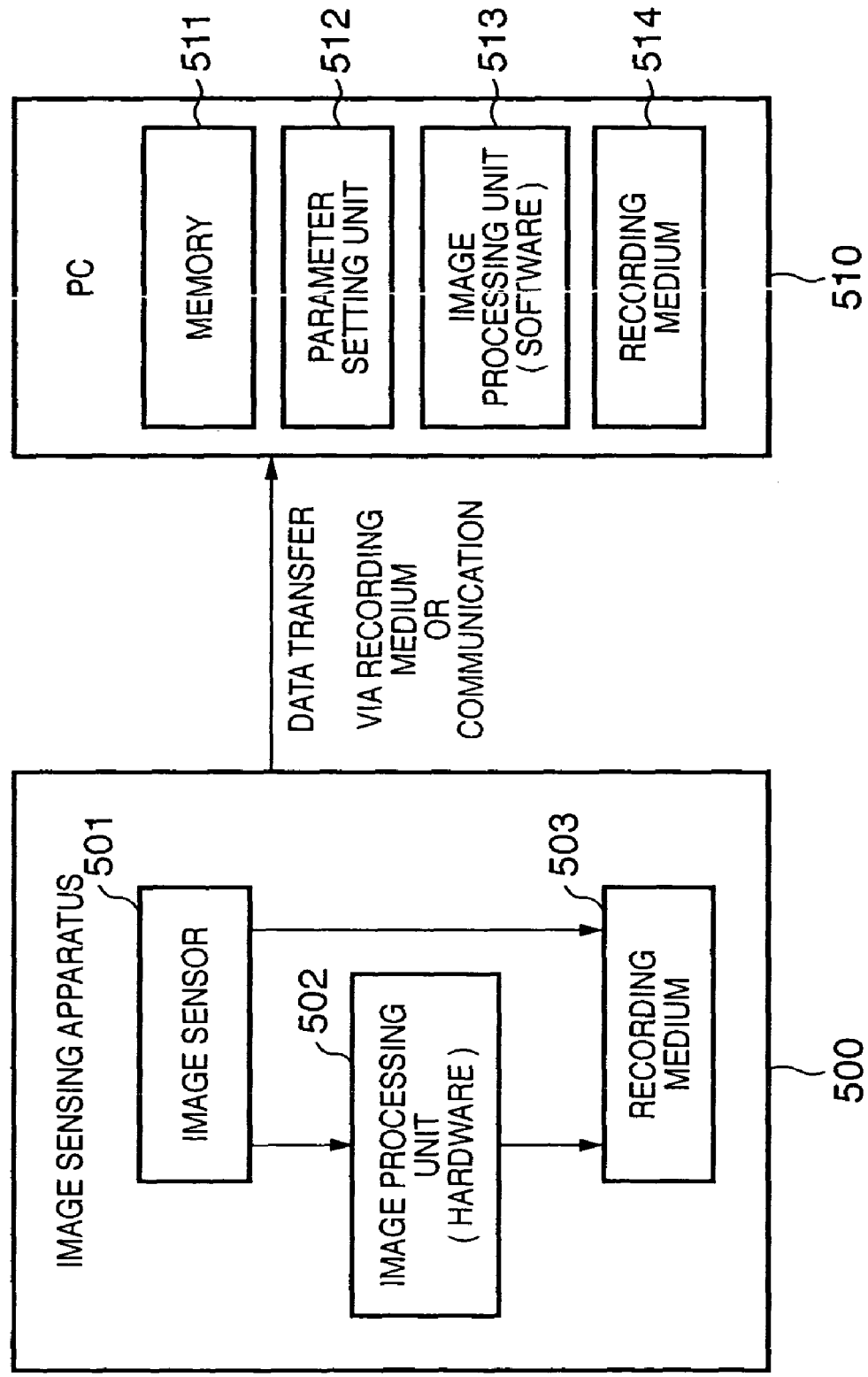

IMAGE SENSING DEVICE AND IMAGE PROCESSING METHOD

FIELD OF THE INVENTION

The present invention relates to an image sensing apparatus and an image processing method capable of making the fast image processing with the parameters set by the user.

BACKGROUND OF THE INVENTION

FIG. 10 is a block diagram showing a conventional image sensing apparatus such as a digital still camera or a digital video camera and a personal computer (PC).

The conventional image sensing apparatus 500 typically performs the processes including image sensing by an image sensor 501 such as a CCD, a signal processing such as correction of image data in an image processing unit 502 and writing data into a recording medium 503, as shown in FIG. 10. However, such image sensing apparatus 500 did not allow the user to regenerate the image data by changing the parameters used for the image processing such as white balance correction and gamma conversion after photographing.

In order to solve such a problem, there is a method in which the image data acquired from the image sensor 501 of the image sensing apparatus 500 is directly recorded on the recording medium 503 without undergoing the signal processing such as white balance correction in the image processing unit 502 (referred to as "raw data" hereinafter), and transferred to the PC 510, where the user changes the parameters used for the image processing such as white balance correction and gamma conversion in a parameter setting unit 512, and the image processing unit 513 develops (reproduces) the raw data, employing the changed parameters. Here, this process is called a "developing process of raw data". Thus, the PC 510 processes raw data input from the image sensing apparatus 500 with the same processes by software as those performed inside the image sensing apparatus 500, so that the user can change the raw data to have desired color and image quality.

However, since the developing processing of such a system greatly depends on the processing speed of the PC, there is a problem that it takes a lot of time to perform the developing processing on the PC having a low processing speed. Also, along with the development of the digital camera having a large number of pixels in recent years, the image data amount is further increased and it takes more time to perform the developing processing.

SUMMARY OF THE INVENTION

The present invention has been made in consideration of the above situation, and has as its object to enable to quickly performing the developing processing in an image sensing apparatus according to the user's preference.

According to the present invention, the foregoing object is attained by providing an image sensing apparatus comprising: an image sensor that senses an image of a subject; a parameter setting unit that sets a parameter to be used for a predetermined developing processing; and an image processing unit that selects raw data from said image sensing unit or externally supplied raw data, and performs the developing processing for the selected raw data, employing the parameter set by said parameter setting unit.

According to the present invention, the foregoing object is also attained by providing an image processing method employed in an image sensing apparatus having an image sensor that senses an image of a subject, said method comprising: setting a parameter to be used for a predetermined developing processing; and performing the developing processing for the raw data output from said image sensor, employing the set parameter.

Further, according to the present invention, the foregoing object is also attained by providing an image sensing apparatus comprising: an image sensor; a recording unit that records raw data obtained from said image sensor to a detachable external storage medium; a digital processing circuit that processes the output from said image sensor; an input unit that inputs raw data from a detachable external storage medium; and a developing processing controller that makes said digital processing circuit perform a predetermined developing processing for the raw data input by said input unit, wherein the raw data input by said input unit includes raw data other than raw data recorded by said recording unit.

Furthermore, according to the present invention, the foregoing object is also attained by providing an image processing method employed in an image sensing apparatus having an image sensor which senses an image of a subject, a recording unit which records raw data obtained from said image sensor to a detachable external storage medium, a digital processing circuit which processes the output from said image sensor, said method comprising: inputting raw data from a detachable external storage medium; and making said digital processing circuit perform a predetermined developing processing for the input raw data, wherein the input raw data includes raw data other than raw data recorded by said recording unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram showing a configuration of an image sensing apparatus according to a first embodiment of the present invention;

FIG. 3 is a view showing a color filter array;

FIGS. 4A to 4D are views showing the concept of signal obtained through an interpolation process;

FIG. 9 is a flowchart showing a flow of an operation of the image sensing apparatus according to the third embodiment of the present invention; and FIG. 10 is a block diagram showing a simple functional configuration of the conventional image sensing apparatus and the PC in terms of the image processing.

DETAILED DESCRIPTION OF THE PREFERRED EMBODIMENTS

Figure 2:
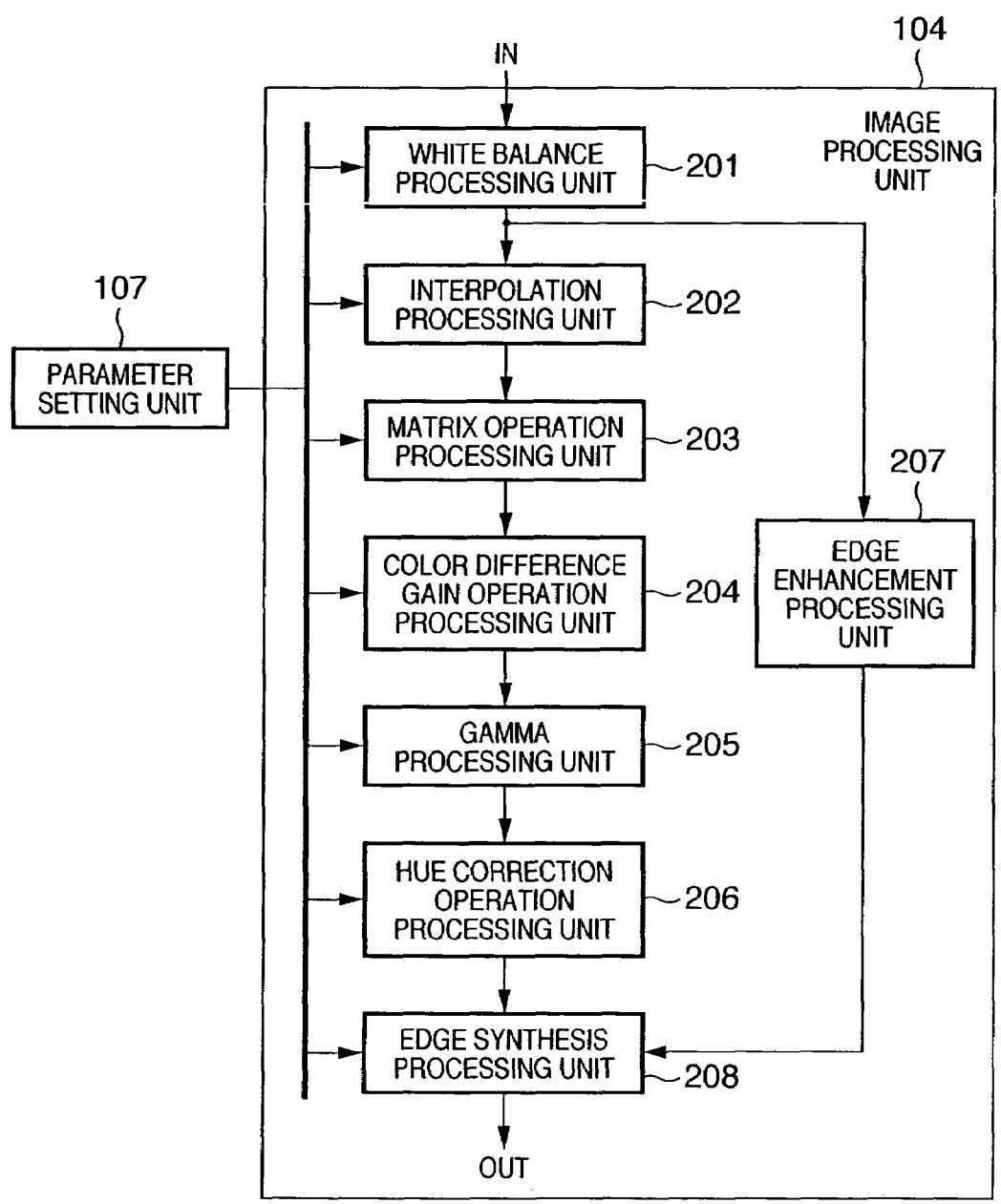
FIG. 2 is a block diagram showing an example of the configuration of an image processing unit as shown in FIG. 1.

Preferred embodiments of the present invention will be described in detail in accordance with the accompanying drawings.

First Embodiment

FIG. 1 is a block diagram showing the schematic configuration of an image sensing apparatus according to a first embodiment of the present invention.

In FIG. 1, reference numeral 101 denotes a lens system having one or more lenses, a diaphragm, and a shutter; 102, an image sensor of CCD or MOS type; 103, an A/D converter; 104, an image processing unit; 105, a format converter; 106, a recording medium controller; 107, a parameter setting unit; and 108, a recording medium. Also, reference numeral 109 denotes a mode change-over switch for switching between a pre-process mode in which an image signal (raw data) sensed by the image sensor 102 undergoes developing processing and recorded on the recording medium 108, and a post-process mode in which raw data sensed by the image sensor 102 is recorded on the recording medium 108, then the parameters for the developing processing are changed according to the user's preference, and the raw data read out from the recording medium 108 is developed employing the changed parameters. The mode changeover switch 109 switches between the pre-process mode and the post-process mode in accordance with a switch instruction by a user operation of, e.g., a switch button (not shown). The operation of each unit of the image sensing apparatus is controlled at a predetermined timing by a controller (not shown).

It should be noted that an image signal, obtained from the image sensor 102, which has undergone A/D conversion but not white balance correction at least is defined as the "raw data" in the first embodiment.

Further, an image signal which has undergone A/D conversion but not a process of separating the image signal into a luminance signal and color signal, color conversion process from color plane data, or lossy compression processing may be defined as "raw data".

First of all, an image sensing procedure of the image sensing apparatus with the above constitution in the pre-process mode will be described in detail.

First of all, an optical image of the subject entering via the lens system 101 is formed on a light receiving area of the image sensor 102. The optical image formed on the light receiving area is converted photoelectrically into an analog signal, which is then passed to the A/D converter 103 for conversion into a digital image signal. The digital image signal converted in the A/D converter 103 is passed to the image processing unit 104. The image processing unit 104 performs various color correction including white balance correction and gamma (γ) conversion and other image signal processings for the digital image signal, employing the parameters set by the parameter setting unit 107 or the default parameters preset for the image sensing apparatus, and outputs the processed image data. The image processing unit 104 may be implemented by either software or hardware, but is capable of the faster processing when constituted by hardware.

The image data output from the image processing unit 104 is converted into a predetermined format, such as a JPEG format or TIFF format, by the format converter 105, and written into a memory of the image sensing apparatus or an external memory, such as a compact flash (registered trade mark), that is a recording medium 108 by the recording medium controller 106.

FIG. 2 is a block diagram showing a schematic functional configuration of the image processing unit 104 shown in FIG. 1. Referring to FIG. 2, the flow of the developing processing in the image sensing apparatus according to the first embodiment will be described below.

In FIG. 2, reference numeral 201 denotes a white balance processing unit; and 202, an interpolation processing unit for interpolating a read signal to give each pixel signal values of all the color as shown in FIGS. 4A to 4D, when the image sensor 102 is covered with a color filter array as shown in FIG. 3. Reference numeral 203 denotes a matrix operation processing unit for adjusting the hue; 204, a color difference gain operation processing unit for adjusting the density of color; 205, a gamma processing unit for adjusting the contrast; 206, a hue correction operation processing unit; 207, an edge enhancement processing unit for extracting the edge portion of image; and 208, an edge synthesis processing unit for adjusting the degree of edge enhancement.

In the pre-process mode, a digital image signal output from the A/D converter 103 of FIG. 1 is sent to the white balance processing unit 201 of the image processing unit 104 as shown in FIG. 2 to calculate a white balance coefficient and a color temperature of a light source so that the white color in the image represents a while signal. Moreover, the digital image signal is multiplied by the white balance coefficient, so that the white color in the image represents the white signal. The digital image signal having undergone the white balance processing is sent to the edge enhancement processing unit 207 and the interpolation processing unit 202. In the case where the image sensor 102 is a single plate CCD having a pixel array as shown in FIG. 3, the interpolation processing unit 202 generates color planes of R, G1, G2 and B as shown in FIGS. 4A to 4D, through a well-known interpolation operation, employing signals of R, G1, G2 and B pixels.

The matrix operation part 203 performs the color conversion for each pixel using an operation (1).

$$\begin{bmatrix} Rm \\ Gm \\ Bm \end{bmatrix} = \begin{bmatrix} M11 & M21 & M31 \\ M12 & M22 & M32 \\ M13 & M23 & M33 \end{bmatrix} \begin{bmatrix} R \\ G \\ B \end{bmatrix} \quad (1)$$

In the operation (1), G (G1+G2)/2

For the digital image signal processed by the matrix operation processing unit 203, a color difference signal is multiplied by a gain in the color difference gain operation processing unit 204. This operation is made in accordance with an operation (2), in which Rm, Gm and Bm signals are converted into Y, Cr and Cb signals. Then, Cr and Cb signals are multiplied by a gain in accordance with an operation (3). Furthermore, the signals Y, Cr and Cb are converted into signals Rg, Gg and Bg in accordance with an operation (4) (inverse matrix operation of operation (2)).

$$\begin{bmatrix} Y \\ Cr \\ Cb \end{bmatrix} = \begin{bmatrix} 0.3 & 0.59 & 0.11 \\ 0.7 & -0.59 & -0.11 \\ -0.3 & -0.59 & 0.89 \end{bmatrix} \begin{bmatrix} Rm \\ Gm \\ Bm \end{bmatrix} \quad (2)$$

$$Cr' = G1 \times Cr \quad (3)$$
$$Cb' = B1 \times Cb$$

$$\begin{bmatrix} Rg \\ Gg \\ Bg \end{bmatrix} = \begin{bmatrix} 0.3 & 0.59 & 0.11 \\ 0.7 & -0.59 & -0.11 \\ -0.3 & -0.59 & 0.89 \end{bmatrix} \begin{bmatrix} Y \\ Cr' \\ Cb' \end{bmatrix} \quad (4)$$

The digital image signal having undergone the color difference operation process is sent to the gamma processing unit 205. The gamma processing unit 205 makes the data conversion in accordance with the following operations (5) to (7). Gamma Table in the operations (5) to (7) is a one-dimensional look-up table.

$$Rt = \text{GammaTable}[Rg] \quad (5)$$

$$Gt = \text{GammaTable}[Gg] \quad (6)$$

$$BT = \text{GammaTable}[Bg] \quad (7)$$

The digital image signal having undergone the gamma processing in the gamma processing unit 205 is sent to the hue correction operation processing unit 206. The arithmetical operation in the hue correction operation processing unit 206 is made in accordance with an operation (8), whereby Rt, Gt and Bt signals are converted into Y, Cr and Cb signals, respectively. Furthermore, Cr and Cb signals are corrected in accordance with an operation (9), and then converted into Rh, Gh and Bh signals in accordance with an operation (10) (inverse matrix operation of the operation (9)).

$$\begin{bmatrix} Y \\ Cr \\ Cb \end{bmatrix} = \begin{bmatrix} 0.3 & 0.59 & 0.11 \\ 0.7 & -0.59 & -0.11 \\ -0.3 & -0.59 & 0.89 \end{bmatrix} \begin{bmatrix} Rt \\ Gt \\ Bt \end{bmatrix} \quad (8)$$

$$\begin{bmatrix} Cr' \\ Cb' \end{bmatrix} = \begin{bmatrix} H11 & H21 \\ H12 & H22 \end{bmatrix} \begin{bmatrix} Cr \\ Cb \end{bmatrix} \quad (9)$$

$$\begin{bmatrix} Rh \\ Gh \\ Bh \end{bmatrix} = \begin{bmatrix} 0.3 & 0.59 & 0.11 \\ 0.7 & -0.59 & -0.11 \\ -0.3 & -0.59 & 0.89 \end{bmatrix}^{-1} \begin{bmatrix} Y \\ Cr' \\ Cb' \end{bmatrix} \quad (10)$$

The digital image signal having undergone the hue correction operation process is sent to the edge synthesis processing unit 208.

The edge enhancement processing unit 207 makes the edge detection on the basis of the digital image signal having undergone the white balance processing that is sent from the white balance processing unit 201, and extracts an edge signal. The extracted edge signal is amplified with a gain, and sent to the edge synthesis processing unit 208. The edge synthesis processing unit 208 adds the edge signal to the Rh, Gh and Bh signals sent from the hue correction operation processing unit 206.

Referring to a flowchart of FIG. 5, the flow of the image sensing process in the post-process mode according to the first embodiment will be described.

First of all, the user uses the image sensor 102 to sense the image, whereby an obtained image signal is converted into a digital image signal by the A/D converter 103 (step S101). In the post-process mode, unlike the pre-process mode, the digital image signal (raw data) is directly recorded on the recording medium 108 without undergoing the developing processing (step S102). Thereafter, the user sets various processing parameters from the parameter setting unit 107 by performing the developing processing for the read-out digital image signal from the recording medium to acquire an image according to the user's preference (step S103).

The kinds of parameters include parameters for the white balance processing unit 201 for adjusting color temperature so that a white subject illuminated by the light source is represented by a white signal, the color difference gain operation processing unit 204 for adjusting the density of color by increasing and/or decreasing the hue of the image, the matrix operation processing unit 203 and the hue correction operation processing unit 206 for changing a color space for reproducing a specific color in accordance with the user's memory or user's preference, the gamma processing unit 205 for adjusting the contrast, and the edge synthesis processing unit 208 for adjusting the degree of edge enhancement which sharpens the image, as shown in FIG. 2, in which part or all of the parameters may be set. Furthermore, parameters for brightness correction processing and for tone control of controlling both hue and brightness may be set.

As for a method of inputting the parameters, the parameters may be selected from numeral levels or words from a parameter input switch (not shown) provided on the image sensing apparatus. For instance, for contrast: (−2, −1, 0, 1, 2), for edge enhancement (sharpness): (−2, −1, 0, 1, 2), for white balance: (cloudy, sun light, light bulb, fluorescent light), color space matrix: (portrait, landscape, AdobeRGB, night view, sun set), hue correction: (angle ±α in hue circle), and so on.

After setting the parameters, if the user presses an image processing execution switch (not shown) (step S104), the digital image signal to be processed is read from the recording medium 108 by the recording medium controller 106 (step S105). The read digital image signal is subjected to the developing processing, employing the parameters set in the image processing unit 104 (step S106), then sent to the format converter 105 for image format conversion (step S107), and recorded on the recording medium 108 by the recording medium controller 106 (step S108). Note that at step S104, it may be so controlled that the processing at step S105 is automatically started after the end of setting the parameters.

The set parameters may be written over or added to tag information (e.g., Exif file) appended to the undeveloped image data.

Before the processed image data is written into the recording medium 108 at step S108, the processed image may be displayed on the display unit (not shown) of the image sensing apparatus for the user to confirm a processed state of the displayed image and instruct whether or not the processed image data is recorded on the recording medium 108.

Upon displaying the developed image, parameters are read from the aforesaid tag information and an image is reproduced, and an image obtained by sampling a part of the reproduced image may be displayed as a thumbnail image on the display unit of the image sensing apparatus.

When recording the developed image data on the recording medium 108, the developed image data may be recorded under the file name in the directory in relation to its undeveloped raw data. For instance, the file name of the raw data having the different extension may be used as the file name of the developed image data.

Further, if the image sensing apparatus has a wireless communication means (not shown) capable of connecting to the internet, for instance, instead of recording the developed image data on the recording medium 108, the developed image data may be directly transmitted to a desired Web site or an e-mail address.

Since a raw data is recorded on the recording medium 108, it is possible to repeatedly apply the developing processing to the image signal read from the recording medium 108 while changing the parameters until a desired image is obtained, or images of different effects are obtained for the same image signal.

According to the first embodiment, it is possible to quickly perform the developing processing according to the user's preference within the image sensing apparatus alone. Also, if the image processing unit 104 is configured by hardware, such as a dedicated processing chip, the developing processing can be made faster.

In the first embodiment, it is possible to select any of two modes, i.e., the pre-process mode and the post-process mode. However, this invention is not limited to such two modes, but the operation may be made in either one of the pre-process mode and the post-process mode.

Second embodiment

A second embodiment of the invention will be described below.

Figure 6:
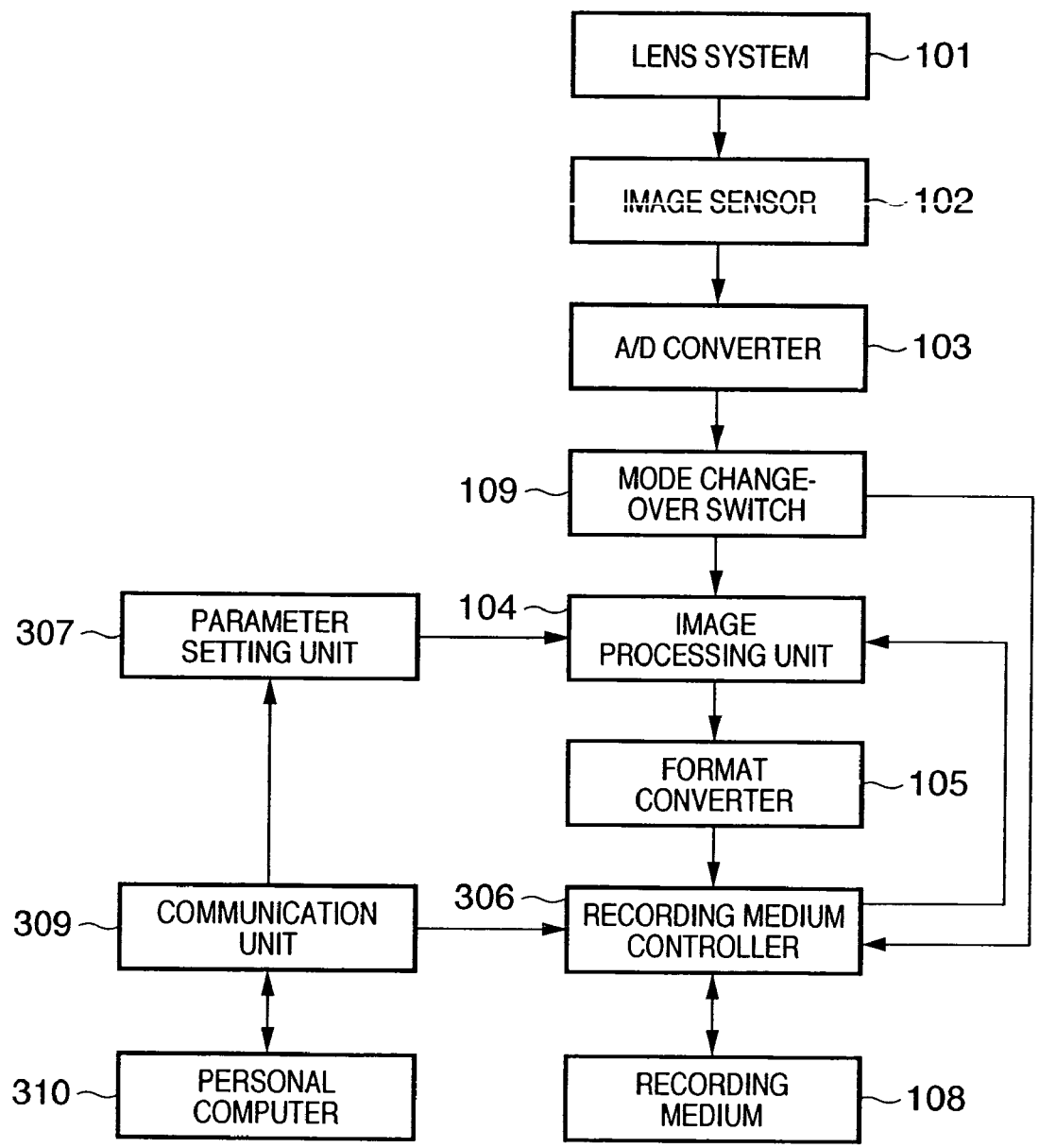
FIG. 6 is a block diagram showing a configuration of an image sensing apparatus according to a second embodiment of the present invention.

FIG. 6 is a block diagram showing the schematic configuration of an image sensing apparatus according to a second embodiment of the invention. In FIG. 6, the same or similar units are designated by the same reference numerals as in FIG. 1, and explanation of those are omitted here.

Though in the first embodiment the image signal sensed by the image sensor 102 is subjected to the developing processing, in the second embodiment the image signal (raw data) supplied from an external personal computer (denoted as "PC") 310 is also subjected to the developing processing. Therefore, the image sensing apparatus in the second embodiment is provided with a communication unit 309. By connecting the image sensing apparatus of the second embodiment to the PC 310, the communication unit 309 enables the data on the recording medium 108 to be sent to the PC 310 under the control of the recording medium controller 306, or the data on the PC 310 to be received and written into the recording medium 108.

Figure 7:
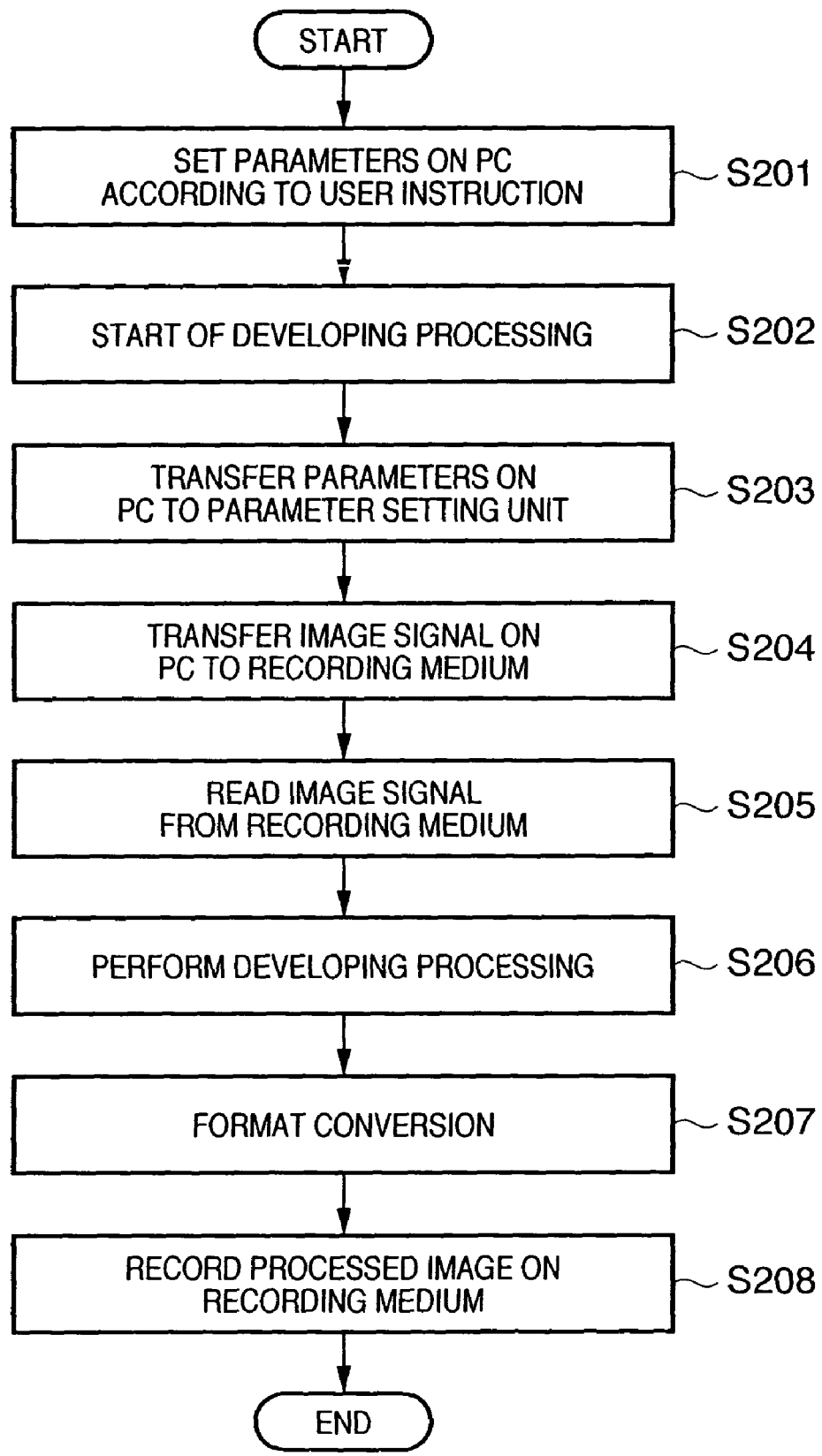
FIG. 7 is a flowchart showing a flow of an operation of the image sensing apparatus according to the second embodiment of the present invention.

FIG. 7 is a flowchart showing a series of developing processing in a state where the image sensing apparatus having the constitution as shown in FIG. 6 and the PC for supplying the image signal of processing object to the image sensing apparatus are connected according to the second embodiment of the invention.

First of all, at step S201, the user sets the parameters on the PC 310 so that the image may be obtained according to the user's preference by performing the developing processing for the unprocessed image signal stored in the PC 310. After setting the parameters, if the user presses an image processing execution switch (not shown) on the PC 310 (step S202), the parameters set on the PC 310 are transferred through the communication unit 309 to the parameter setting unit 307, so that various kinds of parameters necessary for the developing processing are set (step S203). Then, the image signal is written from the PC 310 via the communication unit 309 to the recording medium 108 under the control of the recording medium controller 306 (step S204).

When the transfer of the image signal is ended, the image signal written from the PC 310 into the recording medium 108 under the control of the recording medium controller 306 is read out (step S205), and sent to the image processing unit 104. The read image signal undergoes the developing processing employing the parameters set in the image processing unit 104 (step S206), then is sent to the format converter 105 for image format conversion (step S207), and is recorded on the recording medium 108 under the control of the recording medium controller 306 (step S108).

Before the processed image data is written into the recording medium 108 at step S208, the processed image may be displayed on a display unit (not shown) of the image sensing apparatus as in the first embodiment so that the user can confirm a processed state of the displayed image and instruct whether to record the processed image data on the recording medium 108.

Further, similarly to the first embodiment, upon displaying the developed image, parameters are read from the aforesaid tag information and an image is reproduced, and an image obtained by sampling a part of the reproduced image may be displayed as a thumbnail image on the display unit of the image sensing apparatus.

When recording the developed image data on the recording medium 108, the developed image data may be recorded under the file name in the directory in relation to its undeveloped raw data. For instance, the file name of the raw data having the different extension may be used as the file name of the developed image data.

Further, if the image sensing apparatus has a wireless communication means (not shown) capable of connecting to the internet, for instance, instead of recording the developed image data on the recording medium 108, the developed image data may be directly transmitted to a desired Web site or an e-mail address.

Also, the processed image data may be transferred via the communication unit 309 to the PC 310, instead of being written into the recording medium 108 at step S208. Also, the processed image data may be once recorded onto the recording medium 108, then read out again, and transferred via the communication unit 309 to the PC 310.

Moreover, the parameters are set on the PC 310 and transferred at steps S201 and S203, but this invention is not limited thereto. Various kinds of parameters may be directly set from the parameter setting unit 307 of the image sensing apparatus as in the first embodiment.

According to the second embodiment of the invention, even when the processing speed of the PC is low, the developing processing according to the user's preference can be quickly performed, employing the image processing unit of the image sensing apparatus. Also, when the image processing unit 104 is configured by hardware, the developing processing can be made faster.

Third embodiment

A third embodiment of the invention will be described below.

Figure 8:
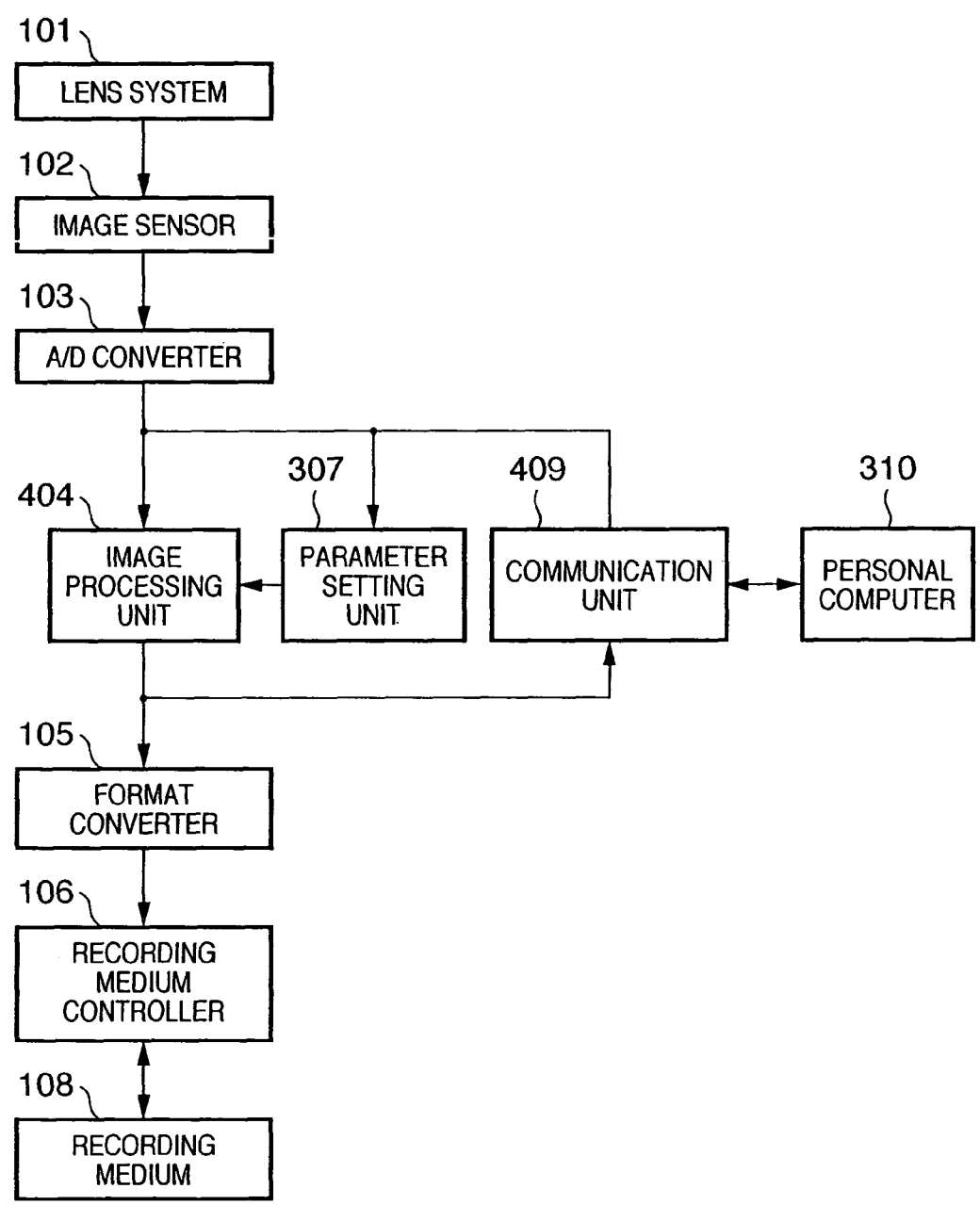
FIG. 8 is a block diagram showing a configuration of an image sensing apparatus according to a third embodiment of the present invention.

FIG. 8 is a block diagram showing the schematic configuration of an image sensing apparatus according to a third embodiment of the invention. In FIG. 8, the same or similar units are designated by the same reference characters as in FIGS. 1 and 6, and explanation of those are omitted here.

Though in the second embodiment the image signal transferred from the PC 310 is once stored in the recording medium 108, and then read out for the developing processing, in this third embodiment the image signal (raw data) transferred from the PC 310 is directly subjected to the developing processing.

FIG. 9 is a flowchart showing a series of developing processing in a state where the image sensing apparatus having the constitution as shown in FIG. 8 and the PC for supplying the image signal of processing object to the image sensing apparatus are connected according to the third embodiment of the invention.

First of all, at step S301, the user sets the parameters on the PC 310 so that the image may be obtained according to the user's preference by performing the developing processing for the unprocessed image signal stored in the PC 310. After setting the parameters, if the user presses an image processing execution switch (not shown) on the PC 310 (step S302), the parameters set on the PC 310 are transferred through a communication unit 409 to the parameter setting unit 307, so that various kinds of parameters necessary for the developing processing are set (step S303). Then, the image signal is transferred from the PC 310 via the communication unit 409 to an image processing unit 404 (step S304). The image signals are transferred in succession from the PC 310, and subjected to the developing processing employing the set parameters in the image processing unit 404 (step S305). The image data after the developing processing is sent via the communication unit 409 to the PC 310 (step S306).

The processed image data may be written into the recording medium 108, instead of being transferred via the communication unit 409 to the PC 310 at step S306. Moreover, the processed image data once recorded onto the recording medium 108 may be read out again, and transferred via the communication unit 409 to the PC 310.

Moreover, the parameters are set on the PC 310 and transferred at steps S301 and S303, but this invention is not limited thereto. Various kinds of parameters may be directly set from the parameter setting unit 307 of the image sensing apparatus as in the first embodiment.

Note that in the first to third embodiments, a case where raw data is supplied from a detachable storage medium and a personal computer, however the present invention is not limited to this. It is possible to configure the image sensing apparatus to generally apply the developing processing to raw data supplied externally (externally supplied raw data) to the image processing apparatus.

This invention may be configured by combining various embodiments or technical elements, as needed.

When the image processing unit is configured by hardware, the developing processing can be made faster.

Other Embodiment

The object of the present invention can also be achieved by providing a storage medium storing program codes for performing the aforesaid processes to an image sensing system or apparatus, reading the program codes, by a CPU or MPU of the image sensing system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image sensing system or apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or apparatus or in a memory provided in a function expansion unit which is connected to the image sensing system or apparatus, CPU or the like contained in the function expansion card or unit performs a part or entire process in accordance with designations of the program codes and realizes functions of the above embodiments.

Figure 5:
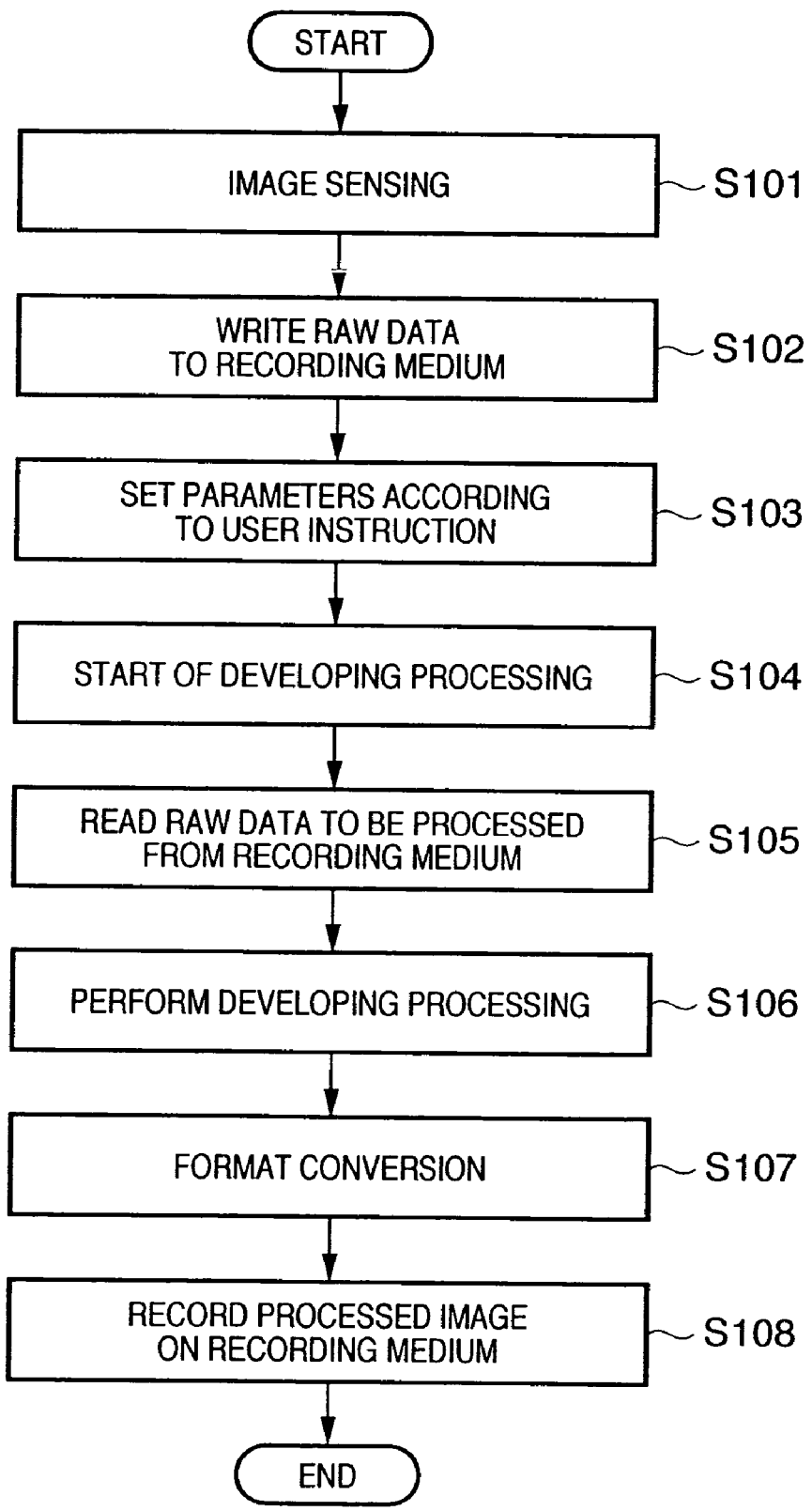
FIG. 5 is a flowchart showing a flow of an operation of the image sensing apparatus in a post-process mode according to the first embodiment of the present invention.

In a case where the present invention is applied to the aforesaid storage medium, the storage medium stores program codes corresponding to the flowchart of FIG. 5, 7 or 9 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:
an image sensor that senses an image of a subject;
a parameter setting unit that sets a parameter to be used for a predetermined developing processing;
an image processing unit that selects raw data from said image sensing unit or externally supplied raw data, and performs the developing processing for the selected raw data, employing the parameter set by said parameter setting unit; and
a communication unit that communicates with an external information processing device, wherein the externally supplied raw data is supplied from the external information processing device via said communication unit,
wherein said image processing unit performs the developing processing for the raw data supplied from the external information processing device successively.

2. The image sensing apparatus according to claim 1, further comprising a detachable storage medium, wherein the raw data from said image sensing unit is stored in said storage medium without undergoing the developing processing, and said image processing unit performs the developing processing for the raw data read from said storage medium.

3. The image sensing apparatus according to claim 1, wherein said parameter setting unit sets a parameter supplied from the external information processing device as the parameter to be used for the developing processing.

4. The image sensing apparatus according to claim 1, wherein the developing processing includes at lease one of white balance processing, chromaticness adjusting processing, color space changing processing, hue correction processing, gamma processing, edge enhancement processing, brightness correction processing, and tone correction processing, and at least one of parameters independently for the respective foregoing processings is set.

5. An image processing method employed in an image sensing apparatus having an image sensor that senses an image of a subject, said method comprising:
setting a parameter to be used for a predetermined developing processing; and
performing the developing processing for the raw data output from said image sensor, employing the set parameter,
wherein said image sensing apparatus comprises a storage medium, said method further comprising:
recording the raw data directly on the storage medium without applying the developing processing; and
reading the image signal recorded on the storage medium, wherein in performing the developing processing, the developing processing is applied to the raw data read from the storage medium,
wherein in performing the developing processing, the raw data supplied from external information processing device is processed successively.

6. The image processing method according to claim 5, further comprising receiving a parameter used for the developing processing from the external information processing device, wherein in setting the parameter, the parameter received from the external information processing device is set as the parameter to be used for the developing processing.

7. The image processing method according to claim 5, wherein the developing processing includes at lease one of white balance processing, chromaticness adjusting processing, color space changing processing, hue correction processing, gamma processing, edge enhancement processing, brightness correction processing, and tone correction processing, and at least one of parameters independently for the respective foregoing processings is set.

8. A recording medium storing a program executable by an information processing device having program codes for implementing an image processing method according to claim 5, wherein a storage medium is readable by an information processing device.

9. A image sensing apparatus comprising;
an image sensor; a recording unit that records raw data obtained from said image sensor to a detachable external storage medium;
a digital processing circuit that processes the output from said image sensor; an input unit that inputs raw data from a detachable external storage medium;
a developing processing controller that makes said digital processing circuit perform a predetermined developing processing for the raw data input by said input unit, wherein the raw data input by said input unit includes raw data other than raw data recorded by said recording unit;
a parameter setting unit that sets a parameter to be used for the developing processing, wherein said developing processing controller makes said digital processing circuit perform a predetermined developing processing for the raw data input by said input unit, employing the parameter set by said parameter setting unit; and
a recording unit that records on a detachable external storage medium image data having undergone the developing processing, wherein the parameter set by said parameter setting unit is recorded in tag information appended to the raw data.

10. The image sensing apparatus according to claim 9, wherein the image data having undergone the developing processing is recorded in relation to its raw data.

11. The image sensing apparatus according to claim 9, wherein a file name of the raw data having different extension is used as a file name of the image data having undergone the developing processing upon recording.

12. The image sensing apparatus according to claim 9 further comprising: a display unit that displays image data; and a thumbnail image generator that generates a thumbnail image to be displayed on said display unit employing the tag information appended to the raw data to which the parameter set by said parameter setting unit is recorded.

13. The image sensing apparatus according to claim 9, wherein said digital processing circuit has a hardware configuration installed in the image sensing apparatus.

14. The image sensing apparatus according to claim 9, wherein the developing processing includes at lease one of white balance processing, chromaticness adjusting processing, color space changing processing, hue correction processing, gamma processing, edge enhancement processing, brightness correction processing, and tone correction processing.

15. The image sensing apparatus according to claim 9, further comprising a wireless communication unit capable of connecting to the internet, wherein the image data having undergone the developing processing is transmitted through said wireless communication unit.

16. A image processing method employed in an image sensing apparatus having an image sensor which senses an image of a subject, a recording unit which records raw data obtained from said image sensor to a detachable external storage medium, a digital processing circuit which processes the output from said image sensor, said method comprising:
inputting raw data from a detachable external storage medium;
making said digital processing circuit perform a predetermined developing processing for the input raw data, wherein the input raw data includes raw data other than raw data recorded by said recording unit;
setting a parameter to be used for the developing processing, wherein, in performing the predetermined developing processing for the input raw data, the set parameter is employed; and
recording on a detachable external storage medium image data having undergone the developing processing, wherein the set parameter is recorded in tag information appended to the raw data.

17. The image processing method according to claim 16, wherein the image data having undergone the developing processing is recorded in relation to its raw data.

18. The image processing method according to claim 16, wherein a file name of the raw data having different extension is used as a file name of the image data having undergone the developing processing upon recording.

19. The image processing method according to claim 16, wherein the image sensor further comprises a display unit that displays image data, said image processing method further comprising: generating a thumbnail image to be displayed on said display unit employing the tag information appended to the raw data to which the set parameter is recorded.

20. The image processing method according to claim 16, wherein said digital processing circuit has a hardware configuration installed in the image processing method.

21. The image processing method according to claim 16, wherein the developing processing includes at lease one of white balance processing, cbromaticness adjusting processing, color space changing processing, hue correction processing, gamma processing, edge enhancement processing, brightness correction processing, and tone correction processing.

22. The image processing method according to claim 16, wherein said image sensing apparatus further comprising a wireless communication unit capable of connecting to the internet, wherein the image data having undergone the developing processing is transmitted through said wireless communication unit.

23. A recording medium storing a program executable by an information processing device having program codes for implementing an image processing method according to claim 16, wherein a storage medium is readable by an information processing device.

* * * * *